United States Patent
Iyer et al.

(10) Patent No.: US 10,922,831 B2
(45) Date of Patent: Feb. 16, 2021

(54) SYSTEMS AND METHODS FOR HANDLING MULTIPLE SIMULTANEOUS LOCALIZATION AND MAPPING (SLAM) SOURCES AND ALGORITHMS IN VIRTUAL, AUGMENTED, AND MIXED REALITY (XR) APPLICATIONS

(71) Applicant: Dell Products, L.P., Round Rock, TX (US)

(72) Inventors: Vivek Viswanathan Iyer, Austin, TX (US); Michael S. Gatson, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 206 days.

(21) Appl. No.: 16/280,810

(22) Filed: Feb. 20, 2019

(65) Prior Publication Data
US 2020/0265598 A1 Aug. 20, 2020

(51) Int. Cl.
*G06T 7/579* (2017.01)
*G06T 7/80* (2017.01)

(52) U.S. Cl.
CPC .............. *G06T 7/579* (2017.01); *G06T 7/80* (2017.01)

(58) Field of Classification Search
CPC .................................. G06T 7/579; G06T 7/80
See application file for complete search history.

(56) References Cited

U.S. PATENT DOCUMENTS

| 9,947,100 B2* | 4/2018 | Moeglein | H04W 4/029 |
| 2015/0094952 A1* | 4/2015 | Moeglein | H04W 4/33 |
| | | | 701/491 |
| 2016/0307328 A1* | 10/2016 | Moeglein | G01S 5/0263 |
| 2018/0321687 A1* | 11/2018 | Chambers | G05D 1/0274 |
| 2019/0383937 A1* | 12/2019 | Comer | G06T 19/00 |
| 2020/0154095 A1* | 5/2020 | Fleischman | G06K 9/00771 |

OTHER PUBLICATIONS

Parveau et al. "3iVClass: A New Classification method for Virtual, Augmented and Mixed Realities" Procedia Computer Science 141 (2018) pp. 263-270.*

(Continued)

*Primary Examiner* — Mia M Thomas
(74) *Attorney, Agent, or Firm* — Fogarty LLP (57) ABSTRACT

Embodiments of systems and methods for handling multiple Simultaneous Localization and Mapping (SLAM) sources and algorithms in virtual, augmented, and mixed reality (xR) applications are described. In an embodiment, an Information Handling System (IHS) may apply a first SLAM algorithm to first SLAM data captured via a first camera source mounted on a Head-Mounted Device (HMD) coupled to the IHS to produce a first Signal-to-Noise (SNR) metric; apply a second SLAM algorithm to the first SLAM data to produce a second SNR metric; select: (i) the first SLAM algorithm in response to the first SNR metric being greater than the second SNR metric, or (ii) the second SLAM algorithm in response to the second SNR metric being greater than the first SNR metric; and produce a map of a space where the HMD is located, at least in part, by applying the selected SLAM algorithm to subsequently captured SLAM data.

20 Claims, 5 Drawing Sheets (56) References Cited

OTHER PUBLICATIONS

Joan Sola, "Simulataneous localization and mapping with the extended Kalman filter," Oct. 5, 2014, 35 pages, retrieved Jan. 4, 2017, available at http://www.iri.upc.edu/people/jsola/JoanSola/objectes/curs_SLAM/SLAM2D/SLAM%20course.pdf.
Occipital, Inc., "Occipital Positional Tracking," 12 pages, retrieved Jan. 3, 2019, available at https://occipital.com/tracking.
Ryan Wang, "What are the Limitations of SLAM Systems?," Mar. 24, 2017, 6 pages, retrieved Jan. 3, 2019, available at https://www.kudan.eu/kudan-news/limitations-slam-systems/, published by Kudan.
Felix Hautot, et al, "Visual Simultaneous Localization and Mapping (VSLAM) methods applied to indoor 3D topographical and radiological mapping in real-time," EPJ Nuclear Sci. Technol. 3, 15, DOI: 10.1051/epjn/2017010, (2017), 14 pages, retrieved Jan. 3, 2019, available at https://www.epj-n.org/articles/epjn/pdf/2017/01/epjn160021.pdf published by EDP Sciences.

\* cited by examiner

SYSTEMS AND METHODS FOR HANDLING MULTIPLE SIMULTANEOUS LOCALIZATION AND MAPPING (SLAM) SOURCES AND ALGORITHMS IN VIRTUAL, AUGMENTED, AND MIXED REALITY (XR) APPLICATIONS

FIELD

The present disclosure generally relates to Information Handling Systems (IHSs), and, more particularly, to systems and methods for handling multiple Simultaneous Localization and Mapping (SLAM) sources and algorithms in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for handling multiple Simultaneous Localization and Mapping (SLAM) sources and algorithms in virtual, augmented, and mixed reality (xR) applications are described. In an illustrative, non-limiting embodiment, an Information Handling System (IHS) may include a processor and a memory coupled to the processor, the memory having program instructions stored thereon that, upon execution by the processor, cause the IHS to: apply a first SLAM algorithm to first SLAM data captured via a first camera source mounted on a Head-Mounted Device (HMD) coupled to the IHS to produce a first Signal-to-Noise (SNR) metric; apply a second SLAM algorithm to the first SLAM data to produce a second SNR metric; select: (i) the first SLAM algorithm in response to the first SNR metric being greater than the second SNR metric, or (ii) the second SLAM algorithm in response to the second SNR metric being greater than the first SNR metric; and produce a map of a space where the HMD is located, at least in part, by applying the selected SLAM algorithm to subsequently captured SLAM data.

The first and second SLAM algorithms may be selected from the group consisting of: an extended Kalman filter (EKF) algorithm, a Monte Carlo algorithm, and a Maximum a posteriori estimation (MAP) algorithm. Moreover, the first camera source may be selected from the group consisting of: a World-Facing Camera (WFC), a Gesture Recognition and Tracking (GRT) camera, an InfraRed (IR) camera, or a Near-IR (NIR) camera.

The program instructions, upon execution, may further cause the HMD to perform at least one of: (i) a spatial or (ii) a temporal down-sampling of camera frames in the first SLAM data.

Each SNR metric may be given by: $SNR=\Sigma_{i=0}^{N-1}(HF\_L(i))$, where N is a number of SLAM landmarks detected in a given camera frame, and wherein $HF\_L(i)$ is an output of a high-pass filter. For example, $HF\_L(i)$ may be the output of an infinite input response (IIR) filter or a finite input response (FIR) filter applied upon a conditional probability associated with SLAM landmark i for the given camera frame.

To select the first SLAM algorithm in response to the first SNR metric being greater than the second SNR metric or to select the second SLAM algorithm in response to the second SNR metric being greater than the first SNR metric, the program instructions, upon execution by the processor, may further cause the HMD to: multiply the first SNR metric by a first weight, multiply the second SNR metric by a second weight, and compare the first and second weighted SNR metrics.

The program instructions, upon execution, may further cause the HMD to: apply the first SLAM algorithm to second SLAM data captured via a second camera source mounted on the HMD to produce a third SNR metric; select: (i) the first camera source in response to the first SNR metric being greater than the third SNR metric, or (ii) the second camera source in response to the third SNR metric being greater than the first SNR metric; and capture the subsequent SLAM data using the selected camera source.

The second SLAM data may be captured concurrently with the first SLAM data. The program instructions, upon execution, may further cause the HMD to translate coordinates of landmarks obtained from the second SLAM data to a coordinate system used by the first SLAM camera source. The program instructions, upon execution, may further cause the IHS to produce a map using the subsequently captured SLAM data.

In another illustrative, non-limiting embodiment, a method may include: applying: (i) a first SLAM algorithm to first SLAM data captured via a first camera source mounted on an HMD to produce a first SNR metric, and (ii) a second SLAM algorithm to the first SLAM data to produce a second SNR metric; applying: (i) the first SLAM algorithm to second SLAM data captured via a second camera source mounted on the HMD to produce a third SNR metric, and (ii) the second SLAM algorithm to the second SLAM data to produce a fourth SNR metric; selecting one of: (i) the first SLAM algorithm and first camera source in response to the first SNR metric being greater than the second, third, and fourth SNR metrics, (ii) the second SLAM algorithm and first camera source in response to the second SNR metric being greater than the first, third, and fourth SNR metrics, (iii) the first SLAM algorithm and second camera source in response to the third SNR metric being greater than the first, second, and fourth SNR metrics, and (iv) the second SLAM algorithm and second camera source in response to the fourth SNR metric being greater than the first, second, and third SNR metrics; capturing subsequent SLAM data using the selected camera source; and producing a map of a space where the HMD is located, at least in part, by applying the selected SLAM algorithm to the subsequently captured SLAM data.

In yet another illustrative, non-limiting embodiment, a hardware memory of an IHS may have program instructions stored thereon that, upon execution by a processor, cause the IHS to: apply a first SLAM algorithm to first SLAM data captured via a first camera source mounted on an HMD coupled to the IHS to produce a first SNR metric; apply the first SLAM algorithm to second SLAM data captured via a second camera source mounted on the HMD to produce a second SNR metric; select: (i) the first camera source in response to the first SNR metric being greater than the second SNR metric, or (ii) the second camera source in response to the second SNR metric being greater than the first SNR metric; capture subsequent SLAM data using the selected camera source; and produce a map of a space where the HMD is located, at least in part, by applying the selected SLAM algorithm to the subsequently captured SLAM data.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for handling multiple Simultaneous Localization and Mapping (SLAM) sources and algorithms in virtual, augmented, and mixed reality (xR) applications. These techniques are particularly useful in xR applications that employ Head-Mounted Devices (HMDs), Heads-Up Displays (HUDs), and eyeglasses-collectively referred to as "HMDs."

Figure 1:
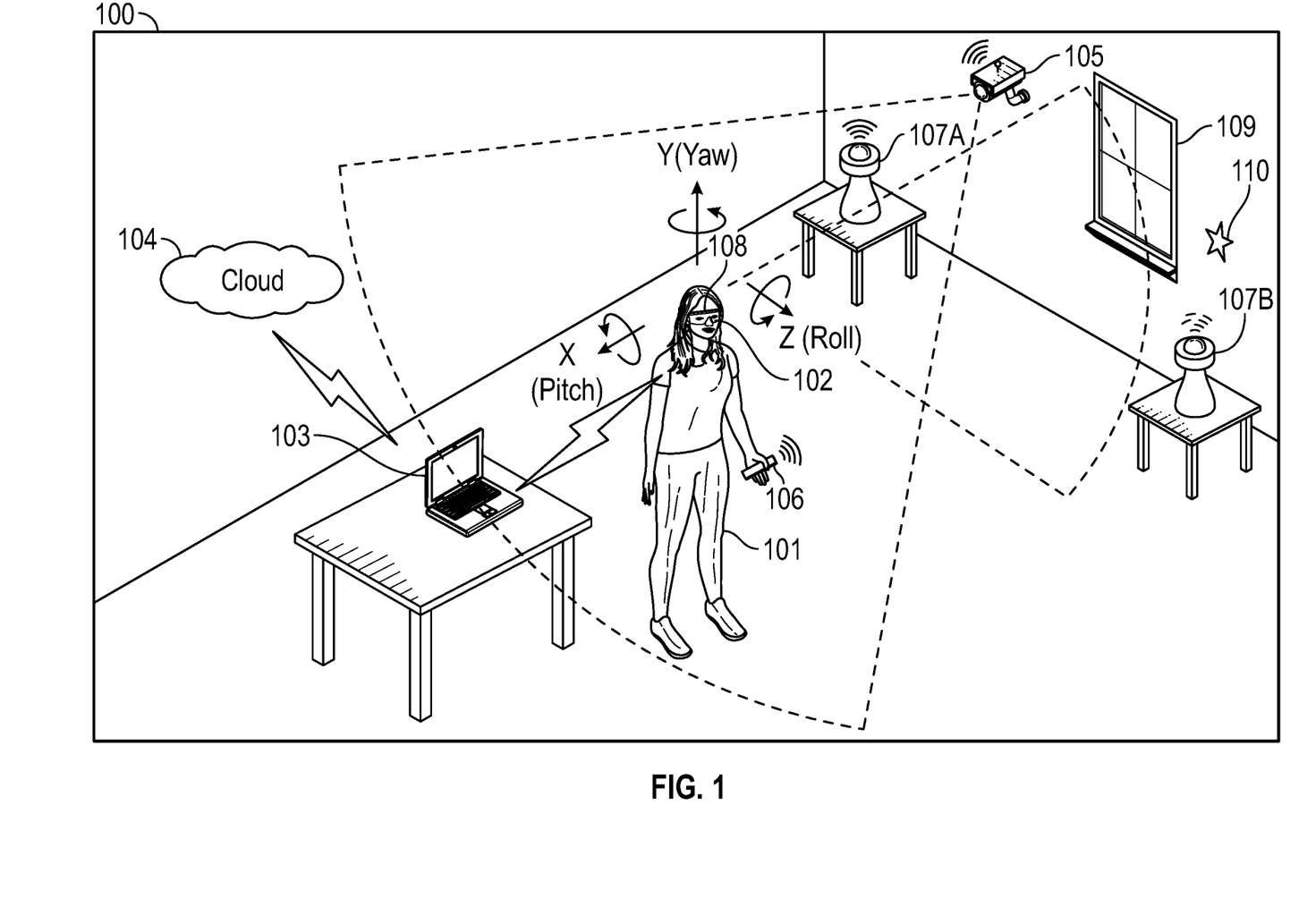
FIG. 1 illustrates an example of an environment where a virtual, augmented, or mixed reality (xR) application may be executed, according to some embodiments.

FIG. 1 is a perspective view of an example of physical environment 100 where an xR application is executed. In various embodiments, user 101 may wear HMD 102 around their heads and over their eyes, during execution of an xR application. An xR application may include a subset of components or objects executed by HMD 102 and another subset of components or objects executed by host IHS 103.

HMD 102 may be tethered to host IHS 103 via a wired or wireless connection. Particularly, host IHS 103 may be used to generate digital images to be displayed by HMD 102. HMD 102 transmits information to host IHS 103 regarding the state of user 101 (e.g., physical position, head orientation, gaze focus, etc.), which in turn enables host IHS 103 to determine which image or frame to show to the user next, and from which perspective.

For instance, as user 101 moves about environment 100, any change in: (i) physical location (e.g., x, y, and z) or translation; or (ii) orientation (e.g., pitch, yaw, and roll) or rotation, may cause host IHS 103 to effect a corresponding change in the picture or symbols displayed to user 101 via HMD 102. These changes may be detected by HMD 102 and processed by host IHS 103, for example, to maintain congruence with the outside world and/or to allow user 101 to look around a consistent xR environment.

In some implementations, host IHS 103 may execute a runtime or rendering engine, such as UNITY, UNREAL, AUTODESK, etc., which produces a visual xR model displayed by HMD 102 from a unique point-of-view, based upon the location, pose, and/or gaze of user 101—which may be determined, at least in part, using Simultaneous Localization and Mapping (SLAM).

As used herein, the term SLAM refers systems and methods that use positional tracking devices to construct a map of an unknown environment where an HMD is located, and that simultaneously identifies where the HMD is located, its orientation, and/or pose.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more totems 106 or tags 110 that are tracked; such that HMD 102 triangulates its position and/or state using those elements.

Inertial tracking may use data from accelerometers and gyroscopes within HMD 102 to find a velocity and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR) (e.g., IR covers a portion of the electromagnetic spectrum from approximately 0.9 μm to 14 μm), or near-IR (NIR) range, a stereo camera, a depth camera, or a 3D camera. With inside-out tracking using markers, for example, camera(s) 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

In some cases, an IR or NIR SLAM camera may be further configured to capture thermographic images of target objects, and to provide accurate non-contact temperature measurements of those objects.

Figure 2:
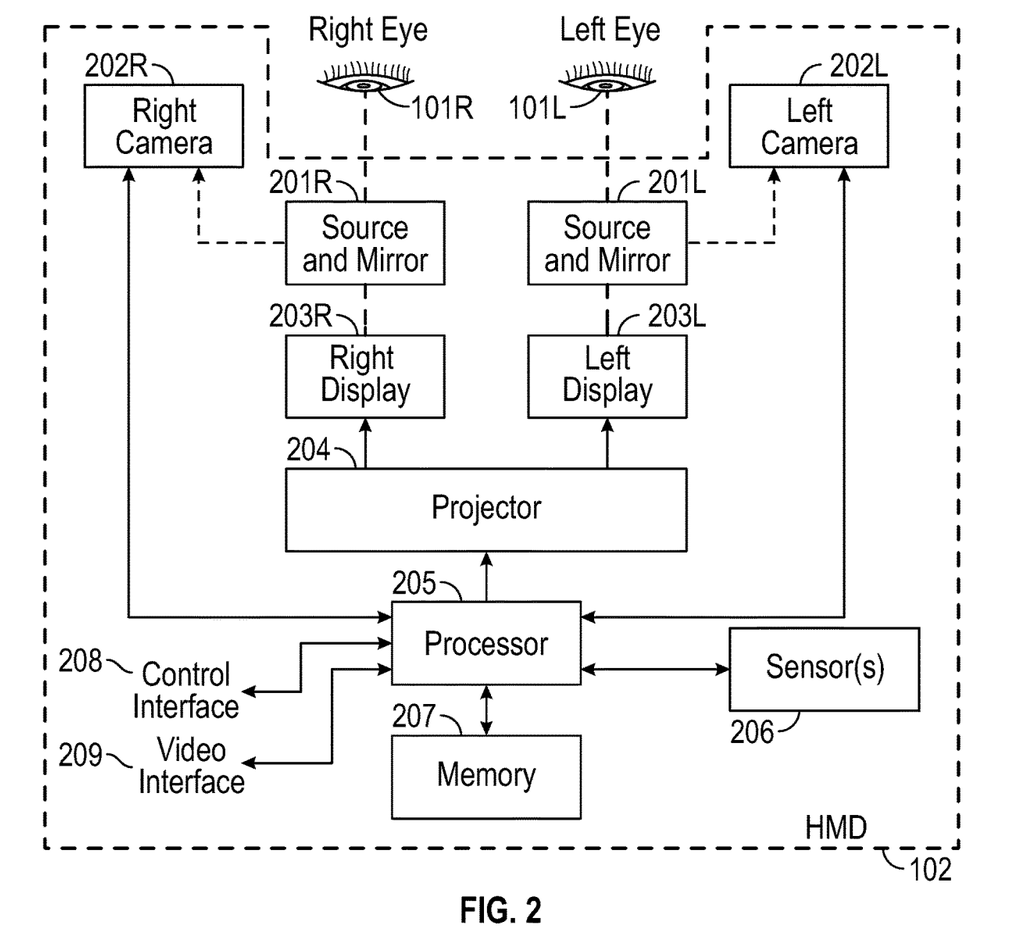
FIG. 2 illustrates an example of electronic components of a Head-Mounted Display (HMD), according to some embodiments.

FIG. 2 illustrates an example of electronic components of HMD 102. In some embodiments, HMD 102 comprises a projection system that includes projector 204 configured to display image frames, including stereoscopic right and left images, on right and left displays 203R and 203L that are viewed by a user right and left eyes 101R and 101L, respectively. Such a projection system may include, for example, a Digital Light Processing (DLP), a Liquid Crystal Display (LCD), or the like. To create a three-dimensional (3D) effect in a 3D virtual view, virtual objects (VOs) may be rendered at different depths or distances in the two images.

HMD 102 includes processor 205 configured to generate frames that are displayed by projector 204. Hardware memory 207 is configured to store program instructions executable by processor 205, as well as other data. In other embodiments, however one or more operations described for processor 205 may be implemented by a different processor within IHS 103.

In some embodiments, HMD 102 may include one or more sensors 206 that collect information about the user's environment (e.g., video, depth, lighting, motion, etc.) and provide that information to processor 205. Sensors 206 may include, but are not limited to, inside-out cameras, outside-in cameras, eye tracking cameras, RGB cameras, gesture cameras, infrared (IR) or near-IR (NIR) cameras, SLAM cameras, etc. Additionally, or alternatively, sensors 206 may include electric, magnetic, radio, optical, infrared, thermal, force, pressure, acoustic, ultrasonic, proximity, position, deformation, movement, velocity, rotation, gyroscopic, and/or acceleration sensor(s). In some cases, sensors 206 may be coupled to processor 205 via a sensor hub.

HMD 102 may be configured to render and display frames to provide an xR view for user 101 according to inputs from sensors 206. For example, an xR view may include renderings of the user's real-world environment based on video captured by camera 108. The xR view may also include virtual objects composited with the projected view of the user's real environment.

In some embodiments, HMD 102 may also include control interface 208 and video interface 209 (e.g., a Bluetooth technology interface, USB interface, etc.) configured to communicate with IHS 103. Control interface 208 may provide forward and backward communication channels between HMD 102 and IHS 103, depending upon the architecture of the xR system, to facilitate execution of an xR application. For example, program instructions stored in memory 207, when executed by processor 205, may cause frames captured by camera(s) 108 to be transmitted to IHS 103 via control interface 208.

IHS 103 may in turn execute SLAM module 403 (FIG. 4) based upon landmarks found in the video frames received from camera source(s) 108. Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to projector 204 via video interface 209 (e.g., High-Definition Multimedia Interface or "HDMI," Digital Visual Interface or "DVI," DISPLAYPORT, etc.). In some cases, video interface 209 may include two separate video interfaces, one for each display 203R/L. Additionally, or alternatively, a single interface that supports multi-stream may be used to drive both displays 203R/L.

Still referring to FIG. 2, right and left Near Infra-Red (NIR) light sources 201R and 201L (e.g., NIR LEDs) may be positioned in HMD 102 to illuminate the user's eyes 101R and 101L, respectively. Mirrors 201R and 201L (e.g., "hot mirrors") may be positioned to direct NIR light reflected from eyes 101R and 101L into EGT cameras 202R and 202L located on each side of the user's face. In other implementations, instead of EGT cameras 202R and 202L, a single EGT camera, or a combination of a wide-angle camera with and a narrower-angle camera, may be used.

EGT information captured by cameras 202R and 202L may be provided to processor 205 to be further processed and/or analyzed. For example, processor 205 may adjust the rendering of images to be projected, and/or it may adjust the projection of the images by the projector 204 based on the direction and angle at which eyes 101R/L are looking. Additionally, or alternatively, processor 205 may estimate the point of gaze on right and left displays 203R and 203L to enable gaze-based interaction with xR content shown on those displays.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
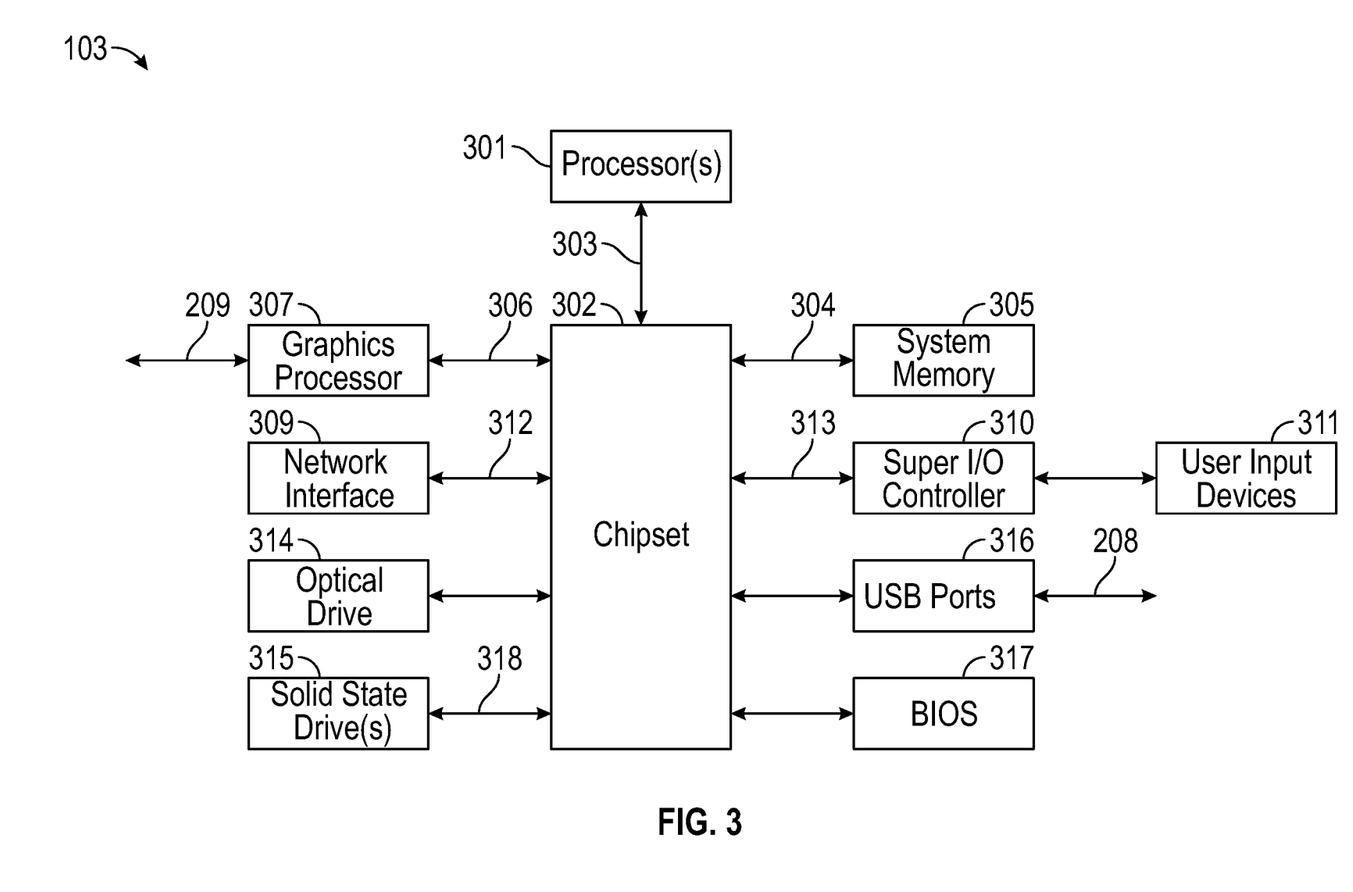
FIG. 3 illustrates an example of electronic components of an Information Handling System (IHS), according to some embodiments.

FIG. 3 is a block diagram of host IHS 103, according to certain embodiments. As shown, IHS 103 may include one or more processors 301. In various implementations, IHS 103 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 103 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of IHS 103. Graphics processor 307 may be coupled to chipset 302 via graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 209.

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of IHS 103 through chipset 302. In certain embodiments, chipset 302 may be coupled to a network interface 309, such as provided by a Network Interface Controller (NIC) that is coupled to IHS 103. In certain embodiments, the network interface 309 may be coupled to chipset 302 via a PCIe bus 312. According to various embodiments, network interface 309 may support communication via various wired and/or wireless networks. In certain embodiments, chipset 302 may also provide access to one or more Universal Serial Bus (USB) ports 316; which in some implementations may serve as transport for establishing control interface 208 with HMD 102.

Chipset 302 also provides access to one or more solid-state storage devices 315. Chipset 302 utilizes a PCIe bus interface connection 318 in order to communication with the solid-state storage device 315. In certain embodiments, chipset 302 may also provide access to other types of storage devices. For instance, in addition to the solid-state storage device 315, an IHS 103 may also utilize one or more magnetic disk storage devices, or other types of the storage devices such as an optical drive or a removable-media drive. In various embodiments, the solid-state storage device 315 may be integral to IHS 103, or may be located remotely from IHS 103.

Another resource that may be accessed by processor(s) 301 via chipset 302 is a Basic Input/Output System (BIOS) 317. As described in more detail below with respect to additional embodiments, upon powering or restarting IHS 103, processor(s) 301 may utilize BIOS 317 instructions to initialize and test hardware components coupled to IHS 103 and to load an operating system for use by IHS 103. BIOS 317 provides an abstraction layer that allows the operating system to interface with certain hardware components that are utilized by IHS 103. Via this hardware abstraction layer provided by BIOS 317, the software executed by the processor(s) 301 of IHS 103 is able to interface with certain I/O devices that are coupled to IHS 103. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
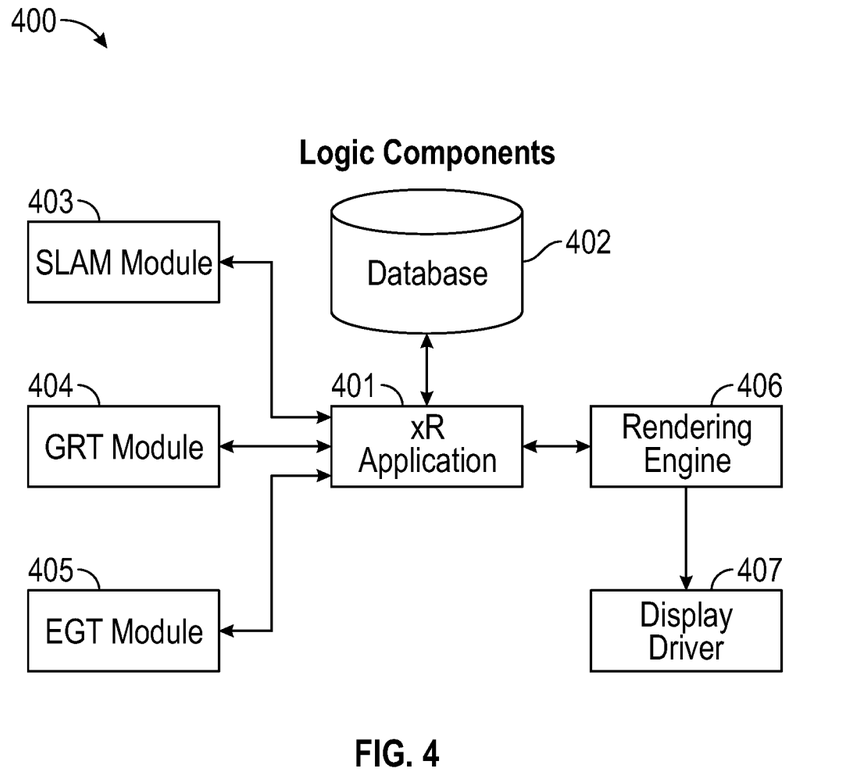
FIG. 4 illustrates an example of logic components of an xR application, according to some embodiments.

FIG. 4 illustrates logic components 400 of xR application 401. In various embodiments, logic components 400 may be executed by IHS 103 and/or HMD 102, such that sub-parts of each of logic components 400 may run on processor 205 of HMD 102 and/or 301 of IHS 103. Moreover, program instructions implementing logic components 400 may be stored in memory 207 of HMD 102 and/or memory 305 of IHS 103.

Generally speaking, xR application 401 may include any type of application now existing or yet to be developed, including, but not limited to: entertainment, video games, robotics, healthcare, education and training, military uses, occupational safety, engineering, industrial or product design, collaboration applications, virtual meetings, etc. Moreover, any data required or otherwise used during operation of xR application 401 may be stored in database 402, discussed in more detail below.

SLAM module 403 uses positional tracking devices to construct a map of an unknown environment where HMD 102 is located, which simultaneously identifies where the HMD is located, its orientation, and/or pose. Generally, SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

An estimator, such as an Extended Kalman filter (EKF), may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100A may be obtained, at least in part, from cloud 104.

For example, HMD 102 may capture IR/NIR frames (e.g., from camera 108), perform image pre-processing operations, generate object detection of landmarks using feature extraction techniques, and send SLAM data (e.g., pixel values for each pixel, along with IR/NIR frame data, coordinates of detected landmarks, etc.) to host IHS 103. Host IHS 103 may perform EKF operations for each detected landmark and it may calculate a Kalman Gain (G) for each landmark (L), which in turn indicates a confidence or probability of the landmark's measured location being accurate.

Gesture Recognition and Tracking (GRT) module 404 may use one or more cameras or optical sensors that enable user 101 to use their actual hands for interaction with virtual objects (VOs) rendered by projector 204 within HMD 102. For example, GRT module 404 may be configured to implement hand tracking and gesture recognition in a 3-D space via a user-facing 2-D camera. In some cases, GRT module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Gesture detection begins when video frame data (e.g., a video or depth-video stream) is received at host IHS 103 from gesture or RGB camera 108 of HMD 102. In some implementations, video data may have already been processed, to some degree, by processor 205 of HMD 102. Then, the video data is further processed by processors 302 and/or 307 in IHS 103 to control aspects of xR application 401, by identifying various gestures and sequences that constitute user input. At least a portion of the user's body may be identified in the video frame data obtained using gesture or RGB camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a geometric model of user 101. If a suitable fit is achieved, then pixels in that section may be recognized as those of user 101.

GRT module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond. Machine learning may be used to assign each pixel a body-part index and/or body-part probability distribution. Such a machine learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger). By analyzing positional change in the various skeletal joints and/or segments, certain corresponding movements that indicate predetermined gestures, actions, or behavior patterns of user 101 may be identified. In other embodiments, the use of a virtual skeleton may not be necessary. For example, in other implementations, raw point-cloud data may be sent directly to a feature extraction routine within a gesture recognition module.

Examples of one and two-handed gestures that may be recognized or tracked by GRT module 404 may include, but are not limited to: gestures for selecting and deselecting VOs, gestures for manipulating selected VOs (e.g., rotation and/or translation following the user's hand direction, position, and/or location), gestures for performing menu operations such as opening, closing, and/or repositioning (again, with menu rotation and/or translation following the user's hand), and gestures for manipulating applications, windows, or workspaces (e.g., using downward or upward swiping hand motion), among many others.

Eye-Gaze Tracking (EGT) module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, EGT module 405 may be configured to identify a direction, extent, and/or speed of movement of the user's eyes in real-time, during execution of an xR application (e.g., a gaze vector). In addition, EGT module 405 may be configured to calculate a region-of-interest of configurable size or shape (e.g., circular, rectangular, etc.), based in part upon the gaze vector.

As used herein, the term "gaze vector" is defined as a group of variables calculated using reflections from pupil center and another set of glints generated in the user's eye. In some cases, a gaze vector may include one or more of the following variables: 3D coordinates (x, y, z) of an initial point (e.g., the midpoint between the user's eyes), and pitch and yaw direction angles.

In various implementations, EGT module 405 may use, among camera(s) and/or sensor(s), NIR light sources to produce glints on the surface of the cornea of the user's eye, and then it may capture images of the eye region using an inward-facing camera. EGT module 405 may estimate the user's gaze from the relative movement between the pupil center and glint positions. Particularly, an eye and/or gaze tracking algorithm may perform corneal reflection-based calculations that use NIR illumination to estimate the gaze direction or the point of gaze using polynomial functions, or a geometrical model of the human eye.

To perform gaze estimation, EGT module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, EGT module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, EGT module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, EGT module 405 may produce, collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, EGT module 405 may be configured to follow the user's gaze direction for natural exploration of a visual scene by capturing the user's visual perspective. Moreover, EGT module 405 may also be configured to estimate user gaze and blink-state for interacting with the xR environment; several types of eye movements and gestures, such as saccades, smooth pursuit and nod-roll may be used. For example, EGT module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 406 may include any engine (e.g., UNITY, UNREAL, AUTODESK, etc.) configured to render an xR model or virtual space displayed by HMD 102 from user 101's unique point-of-view based upon the user's coordinate location (e.g., from SLAM module 403), the user's pose (e.g., from an IMU), and/or the user's gaze (e.g., from EGT module 405). Display driver 407 is coupled to rendering engine 406 and configured to convert rendered video frames to a display format that HMD 102 can reproduce before the user's eyes.

Figure 5:
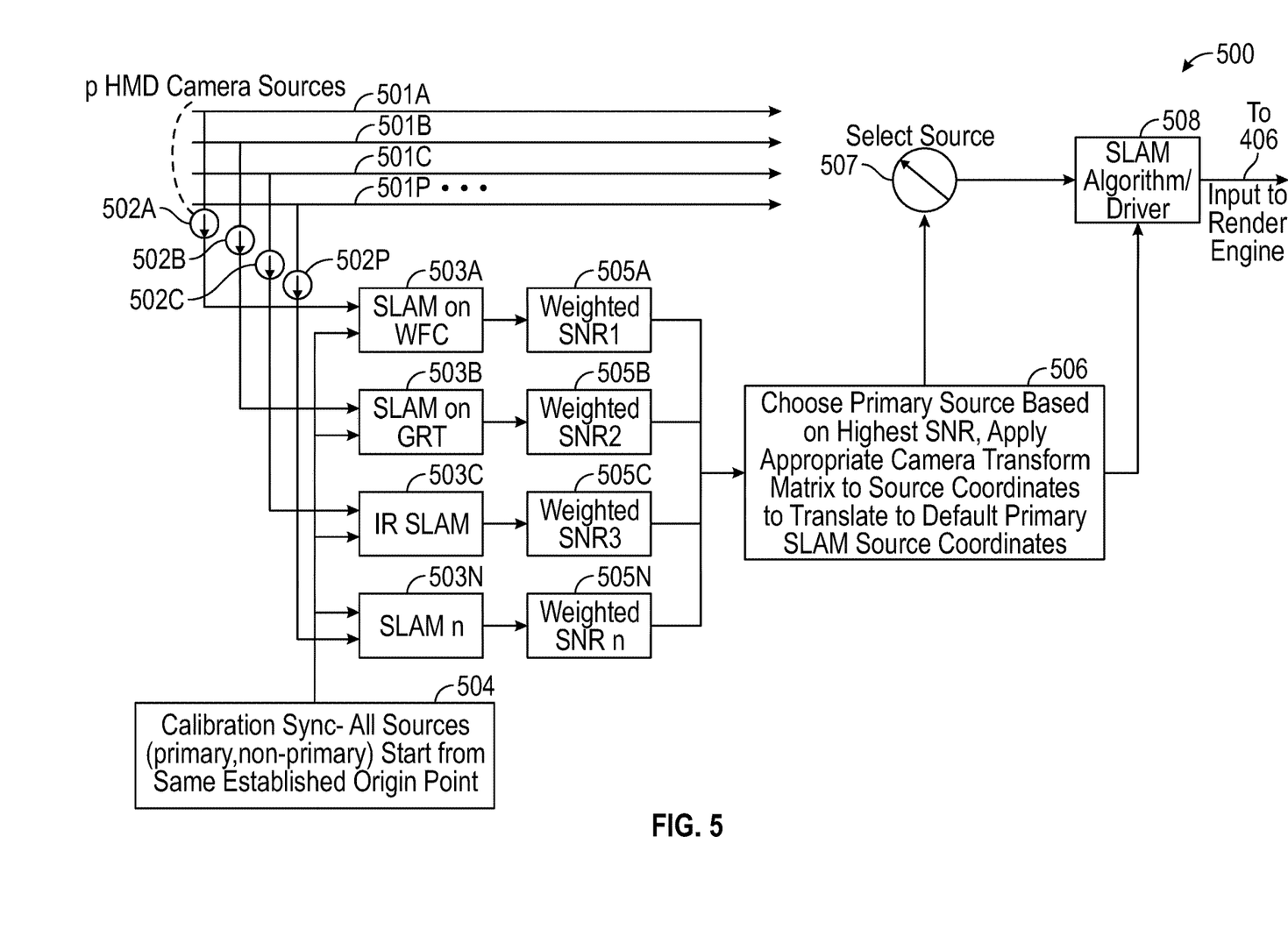
FIG. 5 illustrates an example of a method for handling multiple Simultaneous Localization and Mapping (SLAM) sources and algorithms in xR applications, according to some embodiments.

Database 402 may include if/then rules and/or Look-Up Tables (LUTs) to implement, for example, as described in FIG. 5. In some cases, an if/then rule catalog may be filtered based upon the presence or identification of a master object and/or other surrounding, secondary objects in the user's Field-of-View (FOV). Database 402 may include different if/then rule catalogs based upon the identity of an authenticated user, for example, as part of a profile. Additionally, or alternatively, if/then rules may be based upon historic continuous usage.

As used herein, the terms "transformation matrix" or "transform matrix" refer to matrices that determine how objects move around in space. For example, in some cases a transform matrix may be a 4×4 matrix that defines a transformation when applied to objects: translation, rotation and scaling. Translating an object moves it in space, rotating turns an object around its center, and scaling changes the size of an object. To apply a transform to a 3D object, such as a VO, every vertex in the 3D object may be multiplied by the transformation matrix.

When rendering engine 406 is operating, it needs to know where to place the "view camera" (i.e., the point of view for the render) in a given scene, which is done using a view matrix. For example, in some cases a view matrix may be a 4×4 matrix that contains information about the position and orientation of a viewing camera. Every vertex in the scene or frame may be multiplied the view matrix and the scene is rendered by HMD 102 (although the view matrix says how everything else in the scene should change to reflect the point of view of the camera, the camera itself does not move).

The inverse of the view matrix is referred to as the camera transform matrix, which describes how camera 108 itself moves around a scene or frame. That is, the camera transform matrix provides the position and rotation of camera 108.

To illustrate the distinction between a transform matrix and a view matrix, consider a scene that starts with camera 108 looking directly at a chair that is positioned in front of it. The user then turns the camera 45 degrees to the right (α). In this case the camera transform matrix would be a rotation matrix that indicates a 45-degree rotation to the right. The view matrix, however, would be a rotation matrix that indicates 45-degree rotation to the left around the camera's position. In another scene, if the user turns to the left and walks forward, the camera transform matrix would be a rotation matrix to the left followed by a translation matrix forward, which indicates how the user moved in the frame.

For example, if the user looks to the right (and HMD 102 turns right), the camera transform matrix obtained from SLAM sensor data may include a rotation to the right. If the user looks to the left (and HMD 102 turns left), the camera transform matrix obtained from SLAM sensor data may include a rotation to the left. If the user looks up (and HMD 102 turns upward), the camera transform matrix obtained from SLAM sensor data may include a rotation upward. And if the user looks down (and HMD 102 turns downward), the camera transform matrix obtained from SLAM sensor data may include a rotation downward. More generally, rotations around any axis may be performed by taking a rotation around the x axis, followed by a rotation around the y axis, and followed by a rotation around the z axis—such that any spatial rotation can be decomposed into a combination of principal rotations. Moreover, if HMD 102 moves forward, backward, or sideways, the camera transform matrix obtained from SLAM sensor data also reflects the resulting translation.

The term "world space," for xR application 401, refers to a coordinate system that defines where everything is located inside the application. Every object handled by xR application 401 may be given an X, Y and Z coordinate relative to an origin. Once calibrated, HMD sensors can transform their sensor data into world space coordinates. Then, when transform matrices are applied to 3D objects, the objects are moved around in world space. For instance, world space coordinates may be used by xR application 401 to overlay virtual hands directly on-top of the user's real hands.

Again, during execution of xR application 401, HMD 102 and IHS 103 exchange SLAM sensor data, EGT sensor data, EGT data, inter-process (IPC) communication data via control interface 208, also referred to herein as a "backchannel." Meanwhile, IHS 103 transmits encoded packetized rendered content (e.g., audio-video) to HMD 102 via video interface 209.

Inside-out SLAM implemented on an HMD 102 tethered to a host IHS 103 has the goal of determining a user's position at all times, and also the relative position of any SLAM landmarks found (absolute position with respect to an origin system that is not the true origin) in steady state. In various embodiments, a SLAM system may have an HMD component and an IHS component. The HMD component may perform camera capture, pre-processing, and object detection (of landmarks found in frame of video), and it may send landmark Regions of Interest (ROI) to host 103 along with video frame data. Conversely, the IHS component may perform EKF operations for each SLAM landmark (uses covariance math to get a Kalman Gain) to determine confidence of landmark location (probability), etc.

Conventional inside-out SLAM may have accuracy and tracking performance issues. To address these problems, systems and methods described herein may be configured to leverage SLAM data from other sensors 206, cameras 108, and/or subsystems mounted on HMD 102, such as World Facing Camera visual subsystem (WFC) or a GRT camera, for example, to augment NIR-based SLAM. Additionally, or alternatively, systems and methods described herein may be configured to select different SLAM algorithms for the same SLAM data and/or camera input frequency range (e.g., sparse SLAM versus dense SLAM).

In various scenarios, systems and methods described herein may enable xR application 401 to select a best algorithm and camera source combination for SLAM in steady state, with changing user movement and environmental conditions.

In an implementation, service/method 500 (FIG. 5) may be executed as part of SLAM module 403 of FIG. 4. When executed, service/method 500 may run "s" SLAM algorithms on "p" HMD camera sources. Camera frames included in the SLAM data obtained from each source may be decimated spatially and/or temporally to keep compute requirements manageable. For instance, IHS service 500 may perform a first SLAM algorithm on a visual source, and it may perform a second IR-based SLAM algorithm on a GRT source. Then, IHS service 500 may may determine which combination of SLAM algorithm and camera source produces the best signal-to-noise (SNR) metric, and it may use the selected combination to improve accuracy of overall SLAM performance.

In an embodiment, an SNR metric may be used to process the output of each SLAM algorithm/source combination, and the combination having an SNR metric that indicates highest SLAM performance may be fed into render engine 406. The SNR metric is based on the principle that the best SLAM algorithm/source combination will converge a reasonable majority (or a selected number) of SLAM landmarks' aposterior conditional probabilities to 1.0 faster if there is no user movement during that time (and to correspondingly converge to appropriate conditional probabilities fastest for user movement, meaning better and more accurate tracking). In some cases, this embodiment may involve high-pass filtering of an EKF output.

In another embodiment, a calibrated weighting factor, set at factory or by user, may account for the fidelity of the visual system in each of the camera sources, to bias one up or down versus the other. Each weighting factor may be applied to each corresponding SNR. Calibration may be performed, for example, with a calibrated origin (0,0,0) with all sources running concurrently.

In yet another embodiment, a serial implementation ("Serial Mode") may be employed where a reference SLAM algorithm is used to identify a best camera source. Then, refinements of that algorithm are run only on the selected camera source (versus running p camera source and algorithm combinations (in "Parallel Mode") on IHS 103.

Accordingly, systems and methods described herein adaptively switch SLAM camera source and algorithm combinations based on weighted SNR metrics to mitigate loss of SLAM performance of accuracy without loading up compute resources. These systems and methods may dynamically select the best SLAM algorithm and camera source available in response to changing environment conditions, noise sources, etc. while adding a minimal compute load to IHS 103, with adaptive serial and/or parallel modes to further scale compute load down.

FIG. 5 illustrates an example of service or method 500 for handling multiple SLAM sources and algorithms in xR applications. In various embodiments, method 500 may be performed as part of SLAM module 403, by IHS 103 in cooperation with HMD 102.

Particularly, a plurality of SLAM camera sources produce SLAM data streams 501A-P (in this non-limiting example, 501A from a WFC camera, 502B from a GRT camera, 501C from an IR camera, and 501P from yet another camera mounted on HMD 102).

Under control of calibration synchronization module 504, all camera sources may capture camera frames at the same time, or at pre-set times or intervals, from a commonly established origin point. Then, blocks 503A-N may perform different SLAM algorithm(s) upon streams 501A-P. Examples of SLAM algorithms include an EKF algorithm, a Monte Carlo algorithm, and a Maximum a posteriori estimation (MAP) algorithm. In some cases, the same SLAM algorithm may be applied to different data sources with varying settings or parameters (sparse or dense application of the same algorithm to more or fewer landmarks).

Blocks 505A-N calculate SNR metrics associated with each camera source and SLAM algorithm combination. For example, each SNR metric may be given by: $SNR = \Sigma_{i=0}^{N-1}(HF\_L(i))$, wherein N is a number of SLAM landmarks detected in a given camera frame, and wherein $HF\_L(i)$ is an output of a high-pass filter.

In some cases, SNR calculations may be performed every K camera frames, where K=1 represents every frame of SLAM tracking frames per second (FPS), K=2 represents every other frame, and so on. $HF\_L(i)$ may be the output of an infinite input response (IIR) filter given by $HF\_L(i) = HF\_L(i-1)*\alpha + CP\_L(i)*(1-\alpha)$, where $\alpha$ is a IIR 1-tap filter coefficient with a value selected between 0.0 and 1.0, which may be statically set at start of session, or adaptively at run-time based on desired behavior, and where $CP\_L(i)$ is the conditional probability of landmark "l" reported for that frame of data.

In other cases, $HF\_L(i)$ may be the output of a finite input response (IIR) filter applied upon a conditional probability associated with SLAM landmark i for the given camera frame. HF_L(i) may be calculated as: HF_L(i)=n−1(CP_L(k)*α(i−k)), where k=0, α='n' tap (or 'n' array) digital FIR filter, n as indicated in the range of k as above, and CP_L is as above. These coefficients may be set to achieve a high-pass filtering operation. Moreover, each SNR metric calculated in blocks 505A-N may be multiplied by a corresponding weight prior to the comparison that identifies the combination of source and algorithm with greatest weighted SNR.

Particularly, block 506 selects a primary SLAM source, among all available camera sources, based upon the highest weighted SNR metric. Block 506 also applies a transform matrix to the SLAM data corresponding to a coordinate system used by the currently (or default) primary SLAM camera source and/or to world space. As instructed by block 506, block 507 selects a particular one of SLAM data streams 501A-P for subsequent processing, and block 508 applies a selected SLAM algorithm to the data stream. The result of application of the selected SLAM algorithm and SLAM data streams 501A-P is provided to render engine 406 to produce a map representing the location of HMD 102.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
apply a first Simultaneous Localization and Mapping (SLAM) algorithm to first SLAM data captured via a first camera source mounted on a Head-Mounted Device (HMD) coupled to the IHS to produce a first Signal-to-Noise (SNR) metric;
apply a second SLAM algorithm to the first SLAM data to produce a second SNR metric;
select: (i) the first SLAM algorithm in response to the first SNR metric being greater than the second SNR metric, or (ii) the second SLAM algorithm in response to the second SNR metric being greater than the first SNR metric; and
produce a map of a space where the HMD is located, at least in part, by applying the selected SLAM algorithm to subsequently captured SLAM data.

2. The IHS of claim 1, wherein the first and second SLAM algorithms are selected from the group consisting of: an extended Kalman filter (EKF) algorithm, a Monte Carlo algorithm, and a Maximum a posteriori estimation (MAP) algorithm.

3. The IHS of claim 1, wherein the first camera source is selected from the group consisting of: a World-Facing Camera (WFC), a Gesture Recognition and Tracking (GRT) camera, an InfraRed (IR) camera, or a Near-IR (NIR) camera.

4. The IHS of claim 1, wherein the program instructions, upon execution by the processor, further cause the HMD to perform at least one of: (i) a spatial or (ii) a temporal down-sampling of camera frames in the first SLAM data.

5. The IHS of claim 1, wherein each SNR metric is given by: $SNR=\Sigma_{i=0}^{N-1}(HF\_L(i))$, wherein N is a number of SLAM landmarks detected in a given camera frame, and wherein HF_L(i) is an output of a high-pass filter.

6. The IHS of claim 5, wherein HF_L(i) is the output of an infinite input response (IIR) filter or a finite input response (FIR) filter applied upon a conditional probability associated with SLAM landmark i for the given camera frame.

7. The IHS of claim 1, wherein to select the first SLAM algorithm in response to the first SNR metric being greater than the second SNR metric or to select the second SLAM algorithm in response to the second SNR metric being greater than the first SNR metric, the program instructions, upon execution by the processor, further cause the HMD to: multiply the first SNR metric by a first weight, multiply the second SNR metric by a second weight, and compare the first and second weighted SNR metrics.

8. The IHS of claim 1, wherein the program instructions, upon execution by the processor, further cause the HMD to:
apply the first SLAM algorithm to second SLAM data captured via a second camera source mounted on the HMD to produce a third SNR metric;
select: (i) the first camera source in response to the first SNR metric being greater than the third SNR metric, or (ii) the second camera source in response to the third SNR metric being greater than the first SNR metric; and
capture the subsequent SLAM data using the selected camera source.

9. The IHS of claim 8, wherein the second SLAM data is captured concurrently with the first SLAM data.

10. The IHS of claim 8, wherein the program instructions, upon execution by the processor, further cause the HMD to translate coordinates of landmarks obtained from the second SLAM data to a coordinate system used by the first SLAM camera source.

11. The IHS of claim 8, wherein the program instructions, upon execution by the processor, further cause the IHS to produce a map using the subsequently captured SLAM data.

12. A method, comprising:
applying: (i) a first Simultaneous Localization and Mapping (SLAM) algorithm to first SLAM data captured via a first camera source mounted on a Head-Mounted Device (HMD) to produce a first Signal-to-Noise (SNR) metric, and (ii) a second SLAM algorithm to the first SLAM data to produce a second SNR metric;
applying: (i) the first SLAM algorithm to second SLAM data captured via a second camera source mounted on the HMD to produce a third SNR metric, and (ii) the second SLAM algorithm to the second SLAM data to produce a fourth SNR metric;
selecting one of: (i) the first SLAM algorithm and first camera source in response to the first SNR metric being greater than the second, third, and fourth SNR metrics, (ii) the second SLAM algorithm and first camera source in response to the second SNR metric being greater than the first, third, and fourth SNR metrics, (iii) the first SLAM algorithm and second camera source in response to the third SNR metric being greater than the first, second, and fourth SNR metrics, and (iv) the second SLAM algorithm and second camera source in response to the fourth SNR metric being greater than the first, second, and third SNR metrics;
capturing subsequent SLAM data using the selected camera source; and
producing a map of a space where the HMD is located, at least in part, by applying the selected SLAM algorithm to the subsequently captured SLAM data.

13. The method of claim 12, wherein the first and second SLAM algorithms are selected from the group consisting of: an extended Kalman filter (EKF) algorithm, a Monte Carlo algorithm, and a Maximum a posteriori estimation (MAP) algorithm.

14. The method of claim 12, wherein the first and second camera sources are selected from the group consisting of: a World-Facing Camera (WFC), a Gesture Recognition and Tracking (GRT) camera, an InfraRed (IR) camera, or a Near-IR (NIR) camera.

15. The method of claim 12, wherein the program instructions, upon execution by the processor, further cause the HMD to perform at least one of: (i) a spatial or (ii) a temporal down-sampling of camera frames in the first and second SLAM data.

16. The method of claim 12, wherein each SNR metric is given by: $SNR = \Sigma_{i=0}^{N-1}(HF\_L(i))$, wherein N is a number of SLAM landmarks detected in a given camera frame of the first SLAM data, and wherein HF_L(i) is an output of a high-pass filter.

17. The method of claim 16, wherein HF_L(i) is the output of an infinite input response (IIR) filter or a finite input response (FIR) filter applied upon a conditional probability associated with landmark i for the given camera frame.

18. The method of claim 16, wherein the second SLAM data is captured concurrently with the first SLAM data.

19. A hardware memory of an Information Handling System (IHS), the hardware memory having program instructions stored thereon that, upon execution by a processor, cause the IHS to:
apply a first Simultaneous Localization and Mapping (SLAM) algorithm to first SLAM data captured via a first camera source mounted on a Head-Mounted Device (HMD) coupled to the IHS to produce a first Signal-to-Noise (SNR) metric;
apply the first SLAM algorithm to second SLAM data captured via a second camera source mounted on the HMD to produce a second SNR metric;
select: (i) the first camera source in response to the first SNR metric being greater than the second SNR metric, or (ii) the second camera source in response to the second SNR metric being greater than the first SNR metric;
capture subsequent SLAM data using the selected camera source; and
produce a map of a space where the HMD is located, at least in part, by applying the selected SLAM algorithm to the subsequently captured SLAM data.

20. The hardware memory of claim 19, wherein program instructions, upon execution by the processor, further cause the IHS to:
apply a second SLAM algorithm to the first SLAM data to produce a third SNR metric; and
select: (i) the first SLAM algorithm in response to the first SNR metric being greater than the third SNR metric, or (ii) the second SLAM algorithm in response to the third SNR metric being greater than the first SNR metric.

* * * * *